United States Patent
Huang

(10) Patent No.: US 8,368,783 B2
(45) Date of Patent: Feb. 5, 2013

(54) METHOD FOR ADJUSTING SHOOTING PARAMETERS OF DIGITAL CAMERA

(75) Inventor: Ssu-Hua Huang, Changhua County (TW)

(73) Assignee: Altek Corporation, Hsinchu (TW)

(*) Notice: Subject to any disclaimer, the term of this patent is extended or adjusted under 35 U.S.C. 154(b) by 390 days.

(21) Appl. No.: 12/879,687

(22) Filed: Sep. 10, 2010

(65) Prior Publication Data
US 2012/0062754 A1    Mar. 15, 2012

(51) Int. Cl.
*H04N 5/208* (2006.01)
(52) U.S. Cl. ............ 348/252; 348/366; 348/222.1
(58) Field of Classification Search ......... 348/362, 348/364, 366, 252, 222.1, 345; 382/266, 382/291
See application file for complete search history.

(56) References Cited

U.S. PATENT DOCUMENTS

| 7,860,344 B1* | 12/2010 | Fitzpatrick et al. ........... 382/291 |
| 8,184,196 B2* | 5/2012 | Forutanpour ................. 348/345 |
| 8,248,458 B2* | 8/2012 | Schowengerdt et al. ....... 348/43 |
| 2008/0316359 A1* | 12/2008 | Kim et al. .................... 348/571 |

* cited by examiner

*Primary Examiner* — Tuan Ho
(74) *Attorney, Agent, or Firm* — Morris Manning & Martin LLP; Tim Tingkang Xia, Esq.

(57) ABSTRACT

An adjusting method for adjusting shooting parameters is applied to adjust the shooting parameters according to stability of a camera. In the method, an image is captured first, and an edge-detection procedure is performed on the image to obtain a still value corresponding to a stable state of the camera. Then, shooting parameters, such as a photosensitivity value, an exposure time, or an aperture value, of the camera are adjusted according to the still value.

7 Claims, 5 Drawing Sheets

METHOD FOR ADJUSTING SHOOTING PARAMETERS OF DIGITAL CAMERA

BACKGROUND OF THE INVENTION

1. Field of Invention

The present invention relates to a method for adjusting shooting parameters of a digital camera, and more particularly to a method for adjusting shooting parameters according to stability of a camera.

2. Related Art

When ambient brightness for shooting is not enough, the aperture of a digital camera is usually increased or the exposure time is prolonged to make the photosensitive component exposed adequately. However, as the adjustment to the size of the aperture is limited, the exposure time must be used for compensation during shooting. The aperture may stay open for a few seconds according to the ambient brightness and different features of the digital camera. The digital camera body must remain stable to obtain a clear image when the exposure time is long or in shooting a night scene. Otherwise, even a slight shake may result in a blurred image captured by the digital camera.

In order to avoid shacked image, a user may use a tripod to stabilize the digital camera or use a digital camera that can detect its stable state to elongate the exposure time automatically. Currently, methods for detecting stability of the digital camera mainly depend on additionally equipping the camera with a hardware device, such as a gyro, or a trigger device capable of detecting whether a tripod is installed. However, a problem is that the methods require more hardware cost. Both the component additionally added in the digital camera and man-hours spent in assembling the digital camera are extra costs.

SUMMARY OF THE INVENTION

Accordingly, the present invention is related to a method for adjusting shooting parameters of a digital camera, which is capable of detecting a stable state of the digital camera through software, so as to solve the above problem.

The method for adjusting shooting parameters of the digital camera provided by the present invention comprises: performing a brightness-detection procedure to obtain an ambient brightness value; and performing a parameter-adjustment procedure when the ambient brightness value is smaller than a brightness threshold. The parameter-adjustment procedure comprises: capturing a first image and a second image; computing a still value according to the first image and the second image; and adjusting at least one shooting parameter of the digital camera according to the still value.

In an embodiment of the present invention, the shooting parameters are not adjusted when the ambient brightness value is not smaller than the brightness threshold. The step of computing the still value according to the captured first and second images comprises: performing an edge-detection procedure to mark edge locations of the first image and the second image respectively and compute edge values corresponding to the edge locations; comparing the edge locations of the images respectively to obtain overlapping edges; averaging the edge values of the overlapping edges to obtain an overlapping edge average value; averaging the edge values of all the edge locations in the first image and the second image to obtain an image edge average value; and dividing the overlapping edge average value by the image edge average value to obtain the still value.

In an embodiment of the present invention, the step of adjusting the at least one of the shooting parameter of the digital camera comprises: looking up a parameter adjustment lookup table according to the still value to obtain a photosensitivity value, an exposure time, and an aperture value corresponding to the still value; and adjusting the digital camera according to the photosensitivity value, the exposure time, and the aperture value.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 2 is a schematic structural view of a digital camera that the present invention is applicable to;

DETAILED DESCRIPTION OF THE INVENTION

The detailed features and advantages of the present invention are described below in great detail, and the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1A:
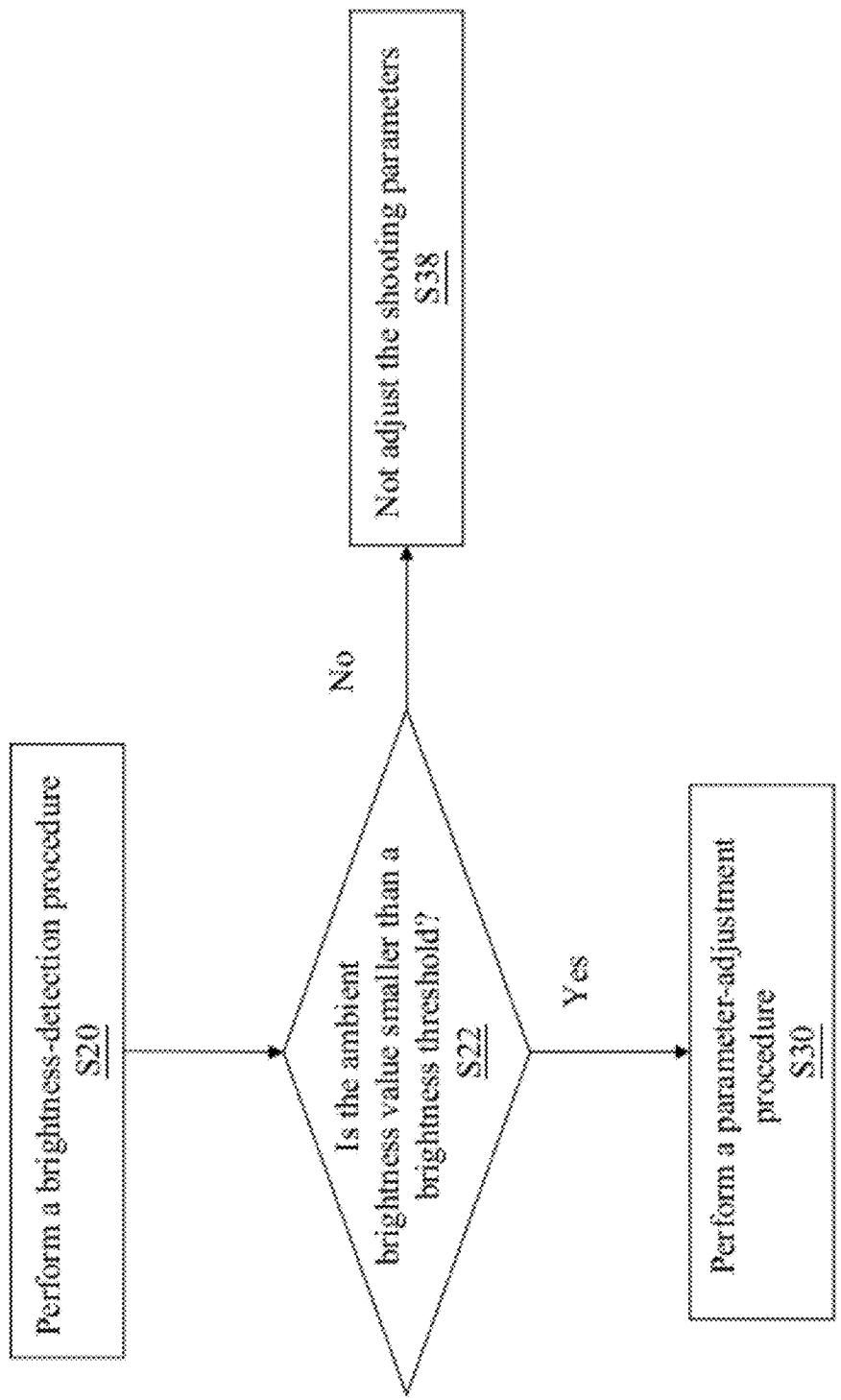
FIG. 1A is a flow chart of a method for adjusting shooting parameters of a digital camera according to an embodiment of the present invention.

FIG. 1A is a flow chart of a method for adjusting shooting parameters of a digital camera according to an embodiment of the present invention. The method of the present invention is applicable to the digital camera 90, and the digital camera 90 may be any dynamic or static image capturing device. The digital camera 90 that the present invention is applicable to may be, but not limited to, the structure as shown in FIG. 2.

Figure 2:
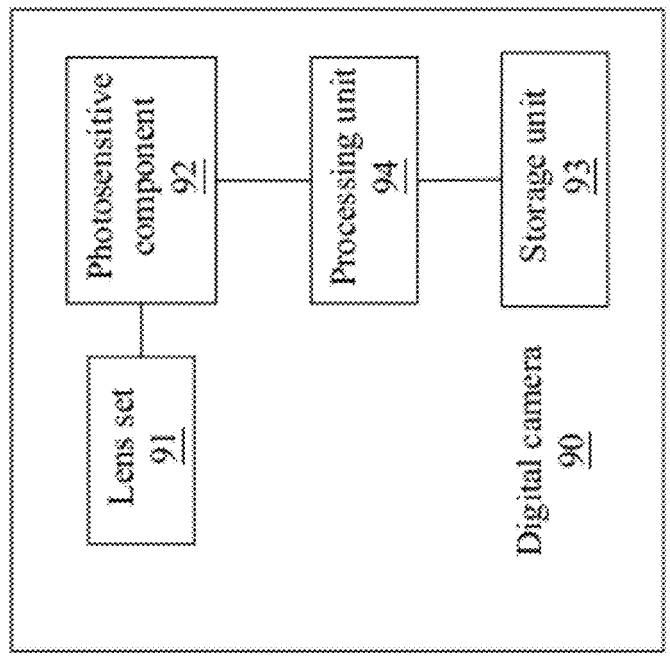

FIG. 2 is a schematic structural view of the digital camera according to the method of the present invention. The digital camera 90 comprises a lens set 91, a photosensitive component 92, a storage unit 93, and a processing unit 94. The lens set 91 may have a drive motor, a shutter, an aperture, and lenses (none of the above components are shown). The processing unit 94 actuates the motor to adjust the lens set 91 according to at least one shooting parameter, so that the lens set 91 moves to a designated focal position. The processing unit 94 may also adjust the size of the aperture and actuate the shutter to open and close through the motor according to shooting parameters such as an aperture value and an exposure time. The photosensitive component 92 is connected to the lens set 91, and capable of converting an image frame of a current scene into an electric signal of the digital image according to a photosensitivity value. The processing unit 94 is electrically connected to the photosensitive component 92 and the storage unit 93, and capable of determining a focal length required to adjust the lens set 91 according to a preview image obtained during the imaging and preview stage. Before shooting, the digital camera 90 adjusts the lens set 91, the aperture, the shutter, and a sensitivity value of the photosensitive component 92 according to shooting parameters (not limited to the photosensitivity value, the exposure time, and the aperture value) adjusted depending on the current ambient condition (the image capturing condition).

Referring to FIG. 1A again, the method for adjusting the shooting parameters of the digital camera 90 comprises: performing a brightness-detection procedure (Step S20) to obtain an ambient brightness value; determining whether the ambient brightness value is smaller than a brightness threshold (Step S22); and performing a parameter-adjustment procedure when the ambient brightness value is smaller than the brightness threshold (Step S30).

In the brightness-detection procedure, brightness computation is performed to obtain the ambient brightness value after the photosensitive component 92 captures an image of a target object. If the ambient brightness value is too small, it indicates that the target object is not bright enough, and Step S30 needs to be performed.

Figure 1B:
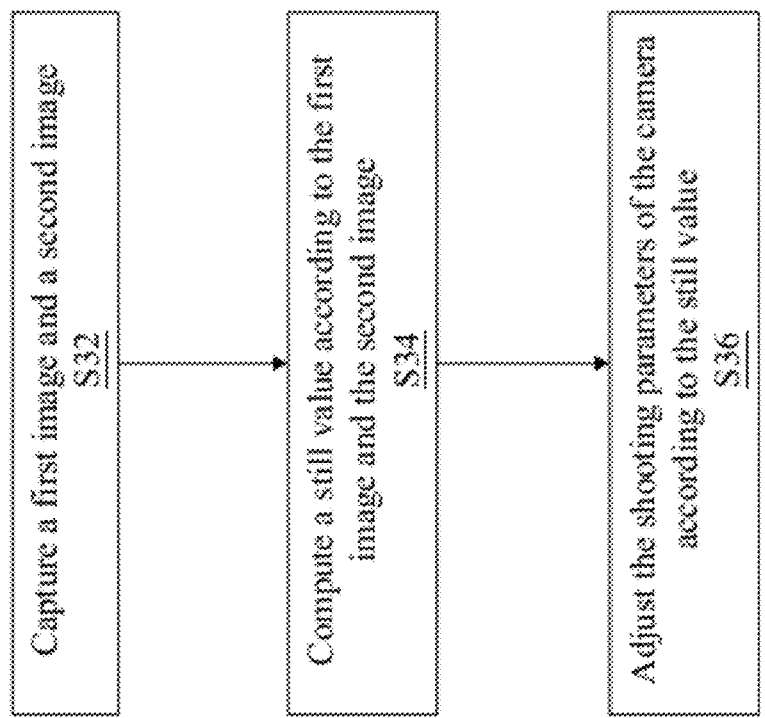
FIG. 1B is a flow chart of a parameter-adjustment procedure according to an embodiment of the present invention.

Referring to FIG. 1B at the same time, FIG. 1B is a flow chart of a parameter-adjustment procedure according to an embodiment of the present invention. The parameter-adjustment procedure in Step S30 comprises: capturing a first image and a second image (Step S32); computing a still value according to the first image and the second image (Step S34); and adjusting at least one shooting parameter of the digital camera 90 according to the still value (Step S36).

In Step S32, the processing unit 94 obtains the first image and the second image consecutively or at intervals with the photosensitive component 92. For different digital cameras 90, the frequency for capturing images at intervals may be 8 frames per second. The first image and the second image, for example, may be the first frame and the second frame, or the first frame and the sixth frame in any order. Besides, in Step S32, multiple images may also be captured. The first and second images captured herein are used for comparing differences between the two images subsequently so as to determine (or to speculate) a stable state of the digital camera 90.

In Step S34, the still value is computed according to the first and second images so as to determine the stable state of the digital camera 90. The larger the still value is, the better the stability of the digital camera 90 will be. For example, a tripod is used for supporting the digital camera 90. On the contrary, the smaller the still value is, the poorer the stability of the digital camera 90 will be. For example, the digital camera 90 is being moved or the hands of the user shake violently.

A still threshold may be obtained through experiments to determine whether the still value is too small or too large. That is, different still values are obtained in the cases of using a tripod or not, and the still threshold is set through averaging or weighted averaging of the still values.

In Step S36, at least one of the shooting parameter of the digital camera 90 is adjusted according to the still value. The shooting parameters may be, but not limited to, the photosensitivity value, the exposure time, and the aperture value. To adjust the photosensitivity value, the processing unit 94 may adjust the photosensitive component 92. To adjust the exposure time or the aperture value, the processing unit 94 may adjust the aperture. In the above manner that the parameters are adjusted according to the still value, a set of shooting parameters can be directly used for shooting when the still value is larger than the still threshold. When the still value is smaller than the still threshold, it indicates that no tripod is used, and another set of shooting parameters are used for shooting. Besides, a dynamic parameter adjustment method may also be adopted, or a parameter adjustment lookup table may be looked up for the corresponding shooting parameters. In another embodiment of the present invention, in Step S38, the shooting parameters of the digital camera 90 are not specially adjusted when the ambient brightness value is not smaller than the brightness threshold.

The digital camera 90 determines whether the current shooting ambiance is bright enough by performing the brightness-detection procedure. Referring to FIG. 3A, the brightness-detection procedure comprises the following steps. A third image is captured first (Step S40), and the third image is converted into a gray-scale image (Step S42). A brightness value of the gray-scale image is computed and serves as the ambient brightness value. The computation of the brightness value is based on each pixel. An RGB value of each pixel is first converted into a gray-scale value (0.6G+0.3R+0.1B). A pixel brightness value of each pixel is computed based on the gray-scale value with a formula $\log_2(0.6G+0.3R+0.1B)$. All the pixel brightness values are then averaged to obtain the ambient brightness value (Step S44).

Figure 3B:
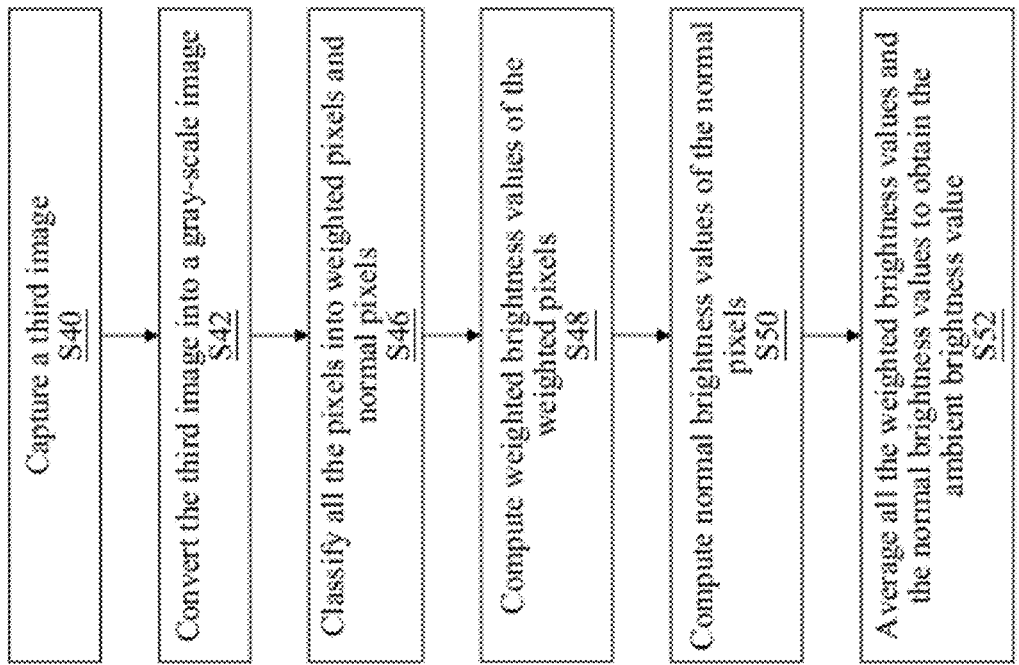
FIG. 3B is a flow chart of Step S20 of an image according to an embodiment of the present invention.
Figure 3A:
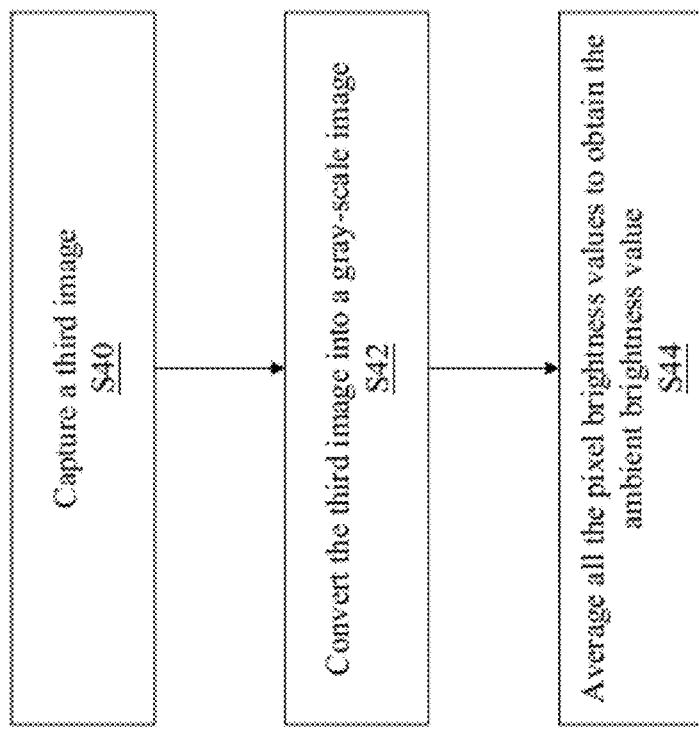
FIG. 3A is a flow chart of an image brightness-detection procedure according to an embodiment of the present invention.

FIG. 3B shows a second embodiment of Step S20 in the present invention. After Step S42, all the pixels may be classified into weighted pixels and normal pixels (Step S46). Weighted brightness values of the weighted pixels and normal brightness values of the normal pixels are computed respectively (Step S48 and Step S50). Finally, all the weighted brightness values and the normal brightness values are averaged to obtain the ambient brightness value (Step S52).

Figure 4:
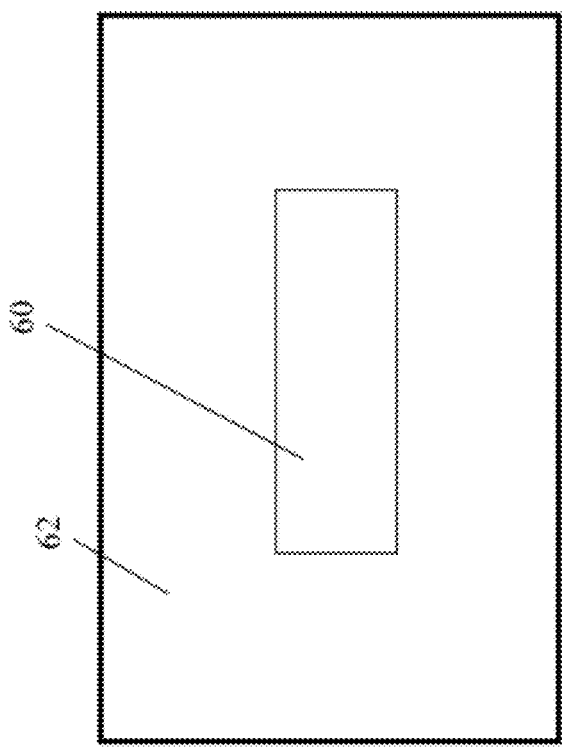
FIG. 4 is a schematic view of weighted pixels and normal pixels for computing an ambient brightness value according to an embodiment of the present invention.

In Step S46, referring to FIG. 4, the pixels in the gray-scale image are classified into weighted pixels and normal pixels according to pixel locations. The classification manner may be, but not limited to, the manner as shown in FIG. 4. For example, the pixels in the central part of the image are regarded as weighted pixels 60, and the pixels outside the central part are regarded as normal pixels 62. In Step S48 and Step S50, the weighted brightness values of all the weighted pixels 60 and the normal brightness values of all the normal pixels 62 are computed respectively. In Step S52, the weighted brightness values and the normal brightness values are summed and then averaged to obtain the ambient brightness value. It is assumed that totally n weighted pixels 60 exist, and the weighted brightness values are marked as $a_1, a_2, \ldots, a_n$ respectively; totally m normal pixels 62 exist, and the normal brightness values are marked as $b_1, b_2, \ldots, b_m$ respectively; and the weight ratio is 4:1. The ambient brightness value=$[(a_1+a_2+\ldots+a_n)*4+(b_1+b_2+\ldots+b_m)*1]/(n+m)]$. Besides, in the brightness-detection procedure, a plurality of images may also be captured for computing to obtain a more accurate ambient brightness value.

It should be noted that, the third image may also be replaced by the first image or the second image to compute the ambient brightness value.

If the ambient brightness value obtained by the brightness-detection procedure is not smaller than the brightness threshold, that is, the ambiance is bright enough and no shooting parameter is specially adjusted before shooting. If the ambient brightness value is smaller than the brightness threshold, a plurality of images is obtained first to compute the still value, so as to determine the stable state of the digital camera 90. The brightness threshold may be set according to hardware of different digital cameras 90. For example, different night scenes are shot first, and brightness values of the shot night scenes are averaged or weighted averaged to obtain a threshold. As it is applicable to shoot night scenes without a flash lamp, when experiments are performed to obtain the brightness threshold by shooting the night scenes, the flash lamp is not used. The "night scene" may also be a scene in a poorly illuminated room, in the dawn, or in the dusk, or a scene in which the exposure is inadequate without the flash lamp and the image is blurred.

Figure 5:
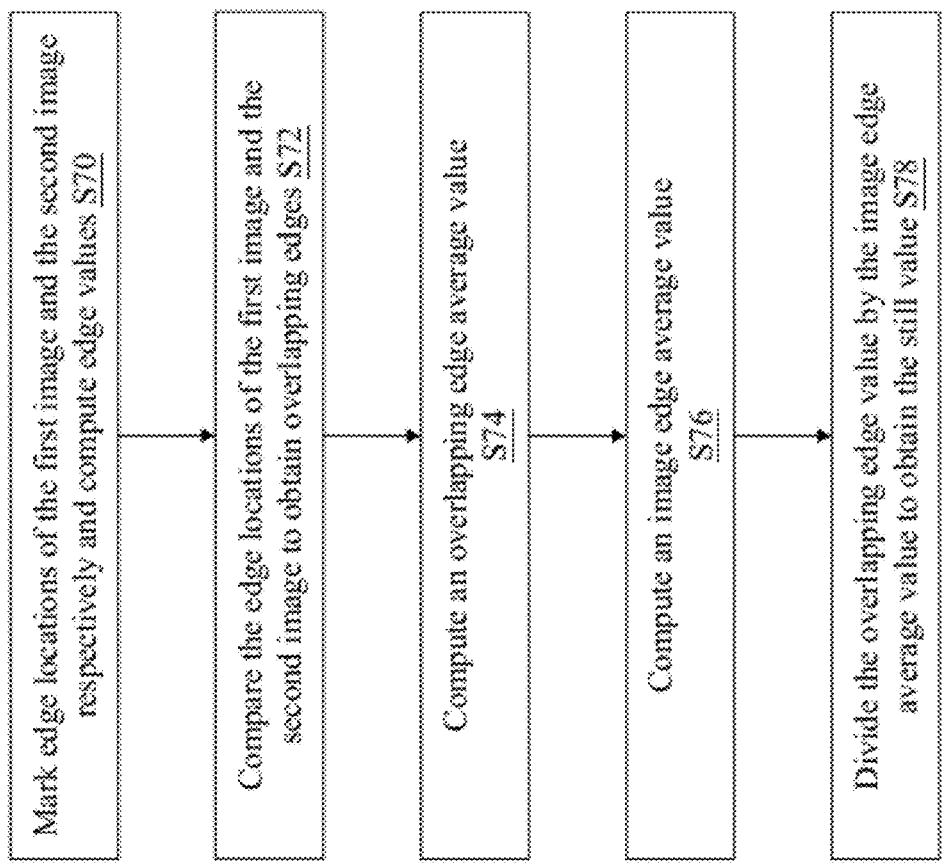
FIG. 5 is a flow chart of a procedure for computing a still value according to an embodiment of the present invention.

Referring to FIG. 5, the step of computing the still value comprises: marking edge locations of the first image and the second image respectively, and computing edge values corresponding to the edge locations (Step S70); comparing the edge locations of the first image and the second image respectively to obtain overlapping edges (Step S72); averaging the edge values of the overlapping edges to obtain an overlapping edge average value (Step S74); averaging the edge values of all the edge locations in the first image and the second image to obtain an image edge average value (Step S76); and dividing the overlapping edge value by the image edge average value to obtain the still value (Step S78).

In Step S70, an edge-detection procedure is performed to mark the edge locations in each image and set the gray-scale values of the pixels marked as the edges to be the edge values. The edge-detection procedure may be used to find edges in the first and second images, such as edges of an object or edges of different color blocks. The edge-detection procedure may adopt a Sobel edge-detection method, a Dijkstra's algorithm, or a Canny edge-detection algorithm.

The overlapping edges means that, the first and second images are compared based on the locations (also referred to as coordinates) of the pixels, and when the same pixel locations in the first and second images are both edge locations, the edges are called "overlapping edges". In Step S74, the edge values of all the overlapping edges in both images are averaged to obtain the overlapping edge average value. In Step S76, the edge values of all the edge locations in both images are averaged to obtain the image edge average value. Finally, the overlapping edge average value is divided by the image edge average value to obtain the still value. In other words, among the edges of the captured first and second images, the larger the proportion of the overlapping parts is, the smaller the differences between the two consecutive images will be, and the digital camera 90 is in a more stable state.

Figure 6C:
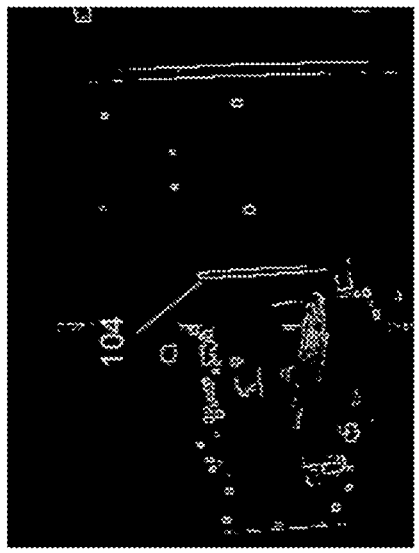
FIG. 6C is a schematic view of edges obtained after edge-detection is performed on a third image according to an embodiment of the present invention.
Figure 6D:
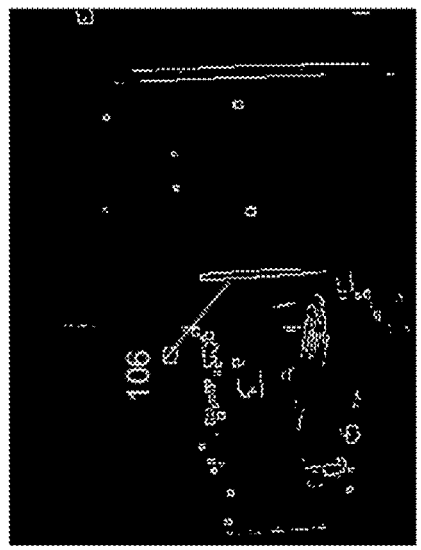
FIG. 6D is a schematic view of an overlapping edge image obtained by overlapping edges of the second image and edges of the third image according to an embodiment of the present invention.
Figure 6A:
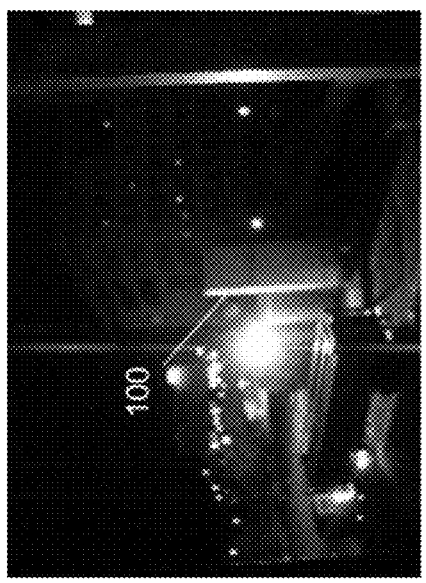
FIG. 6A is a schematic view of a second image according to an embodiment of the present invention.

FIGS. 6A, 6B, 6C, and 6D are schematic views of performing edge-detection and edge overlapping according to an embodiment of the present invention. FIG. 6A shows the second image captured in an environment with poor illumination in the night, in which original objects 100 such as a lamp and a table are provided.

Figure 6B:
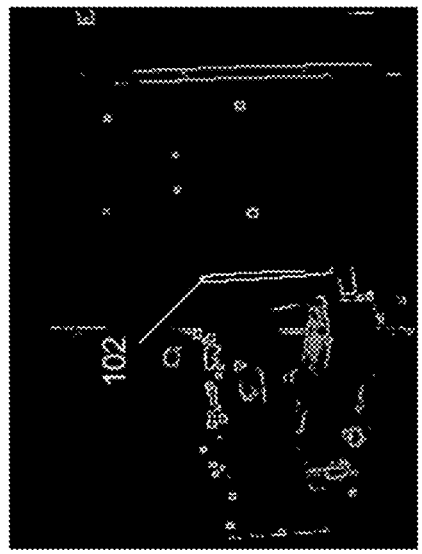
FIG. 6B is a schematic view of edges obtained after edge-detection is performed on the second image according to an embodiment of the present invention.

FIG. 6B shows edges 102 of the second image obtained after the edge-detection procedure is performed on the second image (that is, FIG. 6A). FIG. 6C shows edges 104 of the third image obtained after the edge-detection procedure is performed on the third image (that is, the image captured after FIG. 6A). It can be seen from FIGS. 6B and 6C that, all the edges in the images are found after the images are processed by the edge-detection procedure, and it looks like that only outlines of the objects in the images are left. The location of each pixel along the marked edges is defined as the edge location, and the gray-scale value of each pixel is defined as the edge value.

FIG. 6D shows overlapping edges 106 of the two images obtained after the edges 102 (as shown in FIG. 6B) of the second image and the edges 104 (as shown in FIG. 6C) of the third image are overlapped and compared with each other. The overlapping edges 106 represent the edges that are marked as the edges of the second image and the edges of the third image at the same locations at the same time. The larger the proportion of the overlapping edges 106 in the edges 102 of the second image and in the edges 104 of the third image is, the smaller the differences between the second image and the third image will be, and the digital camera 90 is more stable.

The method for computing the still value is applicable to two or more consecutive images. If two images are captured, the edges of the two images are compared after the edges are marked. If three images are captured, the edges of the three images are marked. In this manner, all the edges of the images are compared to find the overlapping edges 106.

The shooting parameters, such as the photosensitivity value, the exposure time, and the aperture value, are obtained by looking up the parameter adjustment lookup table after the still value is obtained. For example, in a case that the still value is large, a smaller photosensitivity value and a longer exposure time are allowed. In a case that the still value is small, a larger photosensitivity value and a larger aperture value may be required to compensate for a shorter exposure time.

The parameter adjustment lookup table may be created through experiments. The creation of the table through experiments comprises: shooting different night scenes and computing the still value corresponding to each night scene, then performing the experiments to determine the specific shooting parameters corresponding to each still value that are suitable for shooting the corresponding night scene, so as to create the desired parameter adjustment lookup table.

Further, if the parameter adjustment lookup table is not used for searching the shooting parameters corresponding to the still value, a dynamic computation and adjustment method may also be adopted.

In view of the above, whether the camera is in a stable state is determined through the still value. If yes, the brightness value obtained by converting the gray-scale value corresponding to the first, the second, or the third image is acquired by prolonging the exposure time, or changing the photosensitivity value or the aperture value, and thus the corresponding shooting parameters are dynamically computed. Otherwise, if the camera is in an instable state (that is, the still value is too small), the current shooting parameters are used for shooting.

What is claimed is:

1. A method for adjusting shooting parameters of a digital camera, applicable to the digital camera, comprising:
   performing a brightness-detection procedure to obtain an ambient brightness value; and performing a parameter-adjustment procedure when the ambient brightness value is smaller than a brightness threshold, wherein the parameter-adjustment procedure comprises:

capturing a first image and a second image;

computing a still value according to the first image and the second image; and adjusting at least one shooting parameter of the digital camera according to the still value.

2. The method for adjusting the shooting parameters of the digital camera according to claim 1, wherein the brightness-detection procedure comprises:

capturing a third image; and computing the ambient brightness value of the third image.

3. The method for adjusting the shooting parameters of the digital camera according to claim 2, wherein the step of computing the ambient brightness value of the third image comprises:

computing a brightness value of each pixel in the third image respectively; and computing an average value of the brightness values of the pixels to obtain the ambient brightness value.

4. The method for adjusting the shooting parameters of the digital camera according to claim 2, wherein the step of computing the ambient brightness value of the third image comprises:

classifying the pixels of the third image into weighted pixels and normal pixels;

computing a weighted brightness value of each weighted pixel;

computing a normal brightness value of each normal pixel; and computing an average value of the weighted brightness values and the normal brightness values to obtain the ambient brightness value.

5. The method for adjusting the shooting parameters of the digital camera according to claim 1, further comprising:

not adjusting the shooting parameters when the ambient brightness value is not smaller than the brightness threshold.

6. The method for adjusting the shooting parameters of the digital camera according to claim 1, wherein the step of computing the still value according to the first image and the second image comprises:

performing an edge-detection procedure to mark edge locations of the first image and the second image respectively and compute edge values corresponding to the edge locations;

comparing the edge locations of the images respectively to obtain overlapping edges;

averaging the edge values of the overlapping edges to obtain an overlapping edge average value;

averaging the edge values of all the edge locations in the first image and the second image to obtain an image edge average value; and dividing the overlapping edge average value by the image edge average value to obtain the still value.

7. The method for adjusting the shooting parameters of the digital camera according to claim 1, wherein the step of adjusting the at least one shooting parameter of the digital camera according to the still value comprises:

looking up a parameter adjustment lookup table according to the still value to obtain a photosensitivity value, an exposure time, and an aperture value corresponding to the still value; and adjusting the digital camera according to the photosensitivity value, the exposure time, and the aperture value.

* * * * *